United States Patent
Mizuno et al.

(10) Patent No.: US 10,551,822 B2
(45) Date of Patent: Feb. 4, 2020

(54) CAD/CAM-CNC INTEGRATED SYSTEM

(71) Applicant: FANUC CORPORATION, Yamanashi (JP)

(72) Inventors: Tooru Mizuno, Yamanashi (JP); Masako Sudou, Yamanashi (JP); Soichiro Ide, Yamanashi (JP); Osamu Hanaoka, Yamanashi (JP); Yousuke Ootomo, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 188 days.

(21) Appl. No.: 15/656,847

(22) Filed: Jul. 21, 2017

(65) Prior Publication Data
US 2018/0032058 A1    Feb. 1, 2018

(30) Foreign Application Priority Data

Jul. 28, 2016    (JP) .................................. 2016-148664

(51) Int. Cl.
G05B 19/4097    (2006.01)

(52) U.S. Cl.
CPC .................. G05B 19/4097 (2013.01); *G05B 2219/35012* (2013.01)

(58) Field of Classification Search
None
See application file for complete search history.

(56) References Cited

U.S. PATENT DOCUMENTS

| | | | | |
|---|---|---|---|---|
| 4,514,797 A | * | 4/1985 | Begin | G05B 19/4065 340/680 |
| 5,808,888 A | * | 9/1998 | Susnjara | G05B 19/423 700/195 |
| 6,073,058 A | * | 6/2000 | Cossen | G05B 19/4093 700/182 |
| 6,490,498 B1 | | 12/2002 | Takagi | |

(Continued)

FOREIGN PATENT DOCUMENTS

| JP | S62-140745 A | 6/1987 |
|---|---|---|
| JP | S62-166407 A | 7/1987 |

(Continued)

OTHER PUBLICATIONS

Office Action in Japanese Application No. 2016-148664, dated Sep. 18, 2018, 10 pp.
Notice of Allowance in JP Application No. 2016-148664, dated Mar. 5, 2019, 3pp.

*Primary Examiner* — Thomas C Lee
*Assistant Examiner* — Gary Collins
(74) *Attorney, Agent, or Firm* — Hauptman Ham, LLP

(57) ABSTRACT

A CAD/CAM-CNC integrated system, configured with devices related to processes from design of a product to machining and including CAD, CAM and a CNC machine tool, has a shared database that stores information collected during machining or a change made to a machining command by an operator in association with structured information of the machining command. The information collected from a machining site is fed back to the CAM via the shared database, and the fed back information is analyzed to update the machining technique information, thereby making it easy to make use of the know-how accumulated in the machining site.

9 Claims, 5 Drawing Sheets

(56) References Cited

U.S. PATENT DOCUMENTS

| | | | |
|---|---|---|---|
| 6,512,961 B1 * | 1/2003 | Fukaya | G05B 19/40937 700/174 |
| 2002/0091460 A1 * | 7/2002 | Allen | G05B 19/4166 700/173 |
| 2002/0103551 A1 | 8/2002 | Tamamura | |
| 2005/0171629 A1 | 8/2005 | Suh et al. | |
| 2006/0259181 A1 | 11/2006 | Kamiya et al. | |
| 2009/0164038 A1 | 6/2009 | Bretschneider et al. | |
| 2011/0222980 A1 * | 9/2011 | Kuo | B23Q 11/0039 409/80 |
| 2013/0338807 A1 | 12/2013 | De Schepper | |
| 2015/0026107 A1 * | 1/2015 | Vijayaraghavan | G06Q 10/06 706/12 |

FOREIGN PATENT DOCUMENTS

| | | |
|---|---|---|
| JP | H8-328829 A | 12/1996 |
| JP | 2001-219341 A | 8/2001 |
| JP | 2002-233929 A | 8/2002 |
| JP | 2005-11203 A | 1/2005 |
| JP | 2005-177924 A | 7/2005 |
| JP | 2005-521127 A | 7/2005 |
| JP | 2006-99284 A | 4/2006 |
| JP | 2009-53736 A | 3/2009 |
| JP | 2009-509780 A | 3/2009 |
| JP | 2011-22666 A | 2/2011 |
| JP | 2015-525420 A | 9/2015 |
| WO | 00/10769 A1 | 3/2000 |
| WO | 2005/003870 A1 | 1/2005 |

\* cited by examiner

FIG.3A

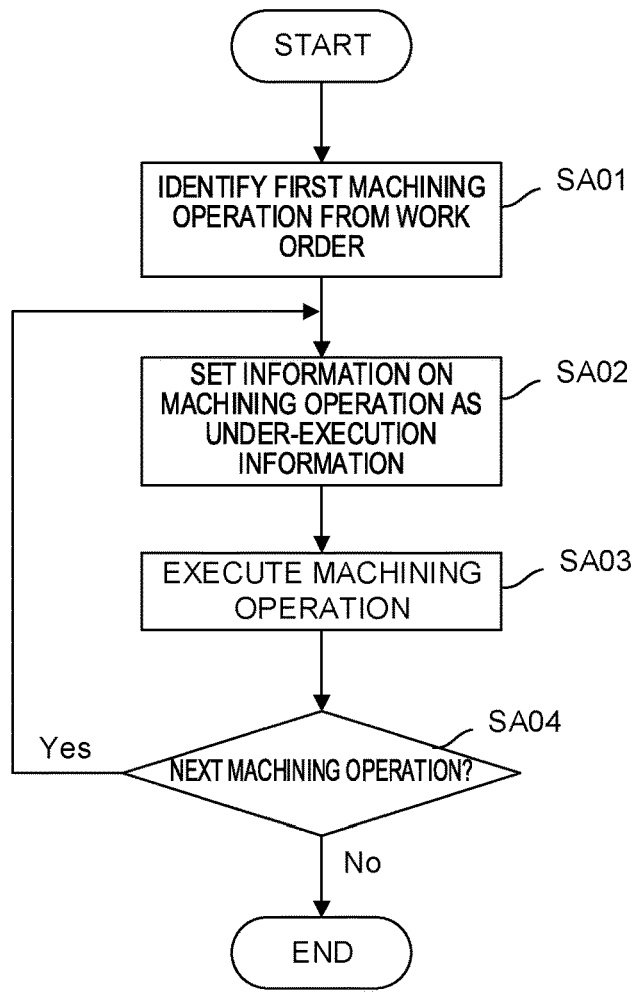

FIG.3B

UNDER-EXECUTION INFORMATION

| | |
|---|---|
| MACHINING OPERATION | POINTER TO MACHINING OPERATION INFORMATION UNIT |
| TOOL WHICH IS USED | POINTER TO TOOL INFORMATION |
| CUTTING CONDITION | FEED SPEED, SPINDLE SPEED, CORNER SPEED, ... |
| TYPE OF TOOL PATH | CONTOUR TYPE AND THE LIKE |
| MISCELLANEOUS FUNCTION | COOLANT AND THE LIKE |
| TYPE OF APPROACH AND EVACUATION | TYPE OF PATH AT THE TIME OF APPROACH TO MACHINING AREA AND EVACUATION THEREFROM |

FIG.4A

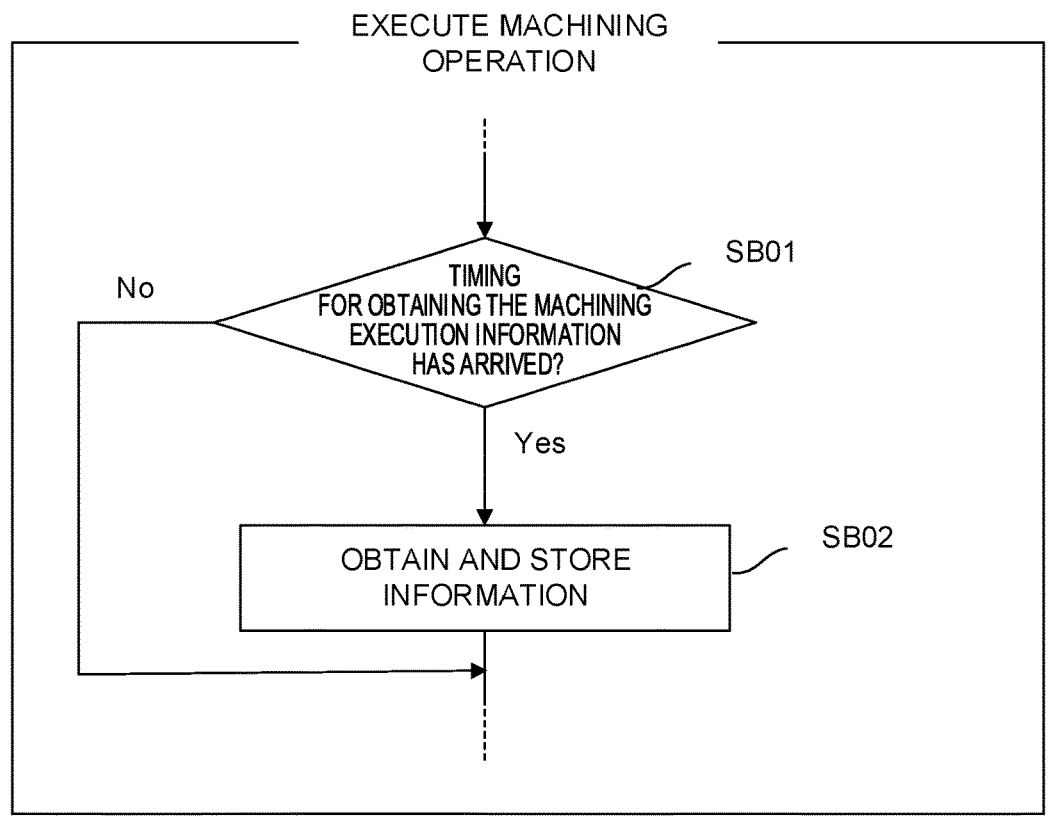

FIG.4B

PART OF MACHINING EXECUTION INFORMATION

| ITEMS | DETAILS |
|---|---|
| MACHINING COMMAND | IDENTIFICATION INFORMATION OF MACHINING COMMAND |
| MACHINING OPERATION | NAME OF MACHINING OPERATION |
| START TIME | TIME AT WHICH MACHINING OPERATION WAS STARTED |
| FINISH TIME | TIME AT WHICH MACHINING OPERATION WAS FINISHED |
| TEMPERATURE OF MACHINE | TEMPERATURE DATA ARRANGED IN CHRONOLOGICAL ORDER |
| MOTOR CURRENT | CURRENT VALUES OF FEED-AXIS DRIVE MOTOR ARRANGED IN CHRONOLOGICAL ORDER |
| OVERRIDE | TIME AT WHICH OPERATOR CHANGED OVERRIDE AND CHANGED VALUE |

FIG.5

PART OF CHANGE INFORMATION

| ITEMS | DETAILS |
|---|---|
| MACHINING COMMAND | IDENTIFICATION INFORMATION OF MACHINING COMMAND TO WHICH A CHANGE WAS MADE |
| PERSON WHO MADE CHANGE | NAME OF OPERATOR WHO MADE THE CHANGE |
| TIME OF CHANGE | TIME AT WHICH THE CHANGE WAS MADE |
| CHANGED INFORMATION | NAME OF CHANGED INFORMATION UNIT |
| PATH TO INFORMATION | PATH TO CHANGED INFORMATION UNIT FROM INFORMATION UNIT IN HIGHEST LEVEL OF HIERARCHY |
| DETAILS OF CHANGE | VALUE BEFORE THE CHANGE AND VALUE AFTER THE CHANGE |

FIG.6

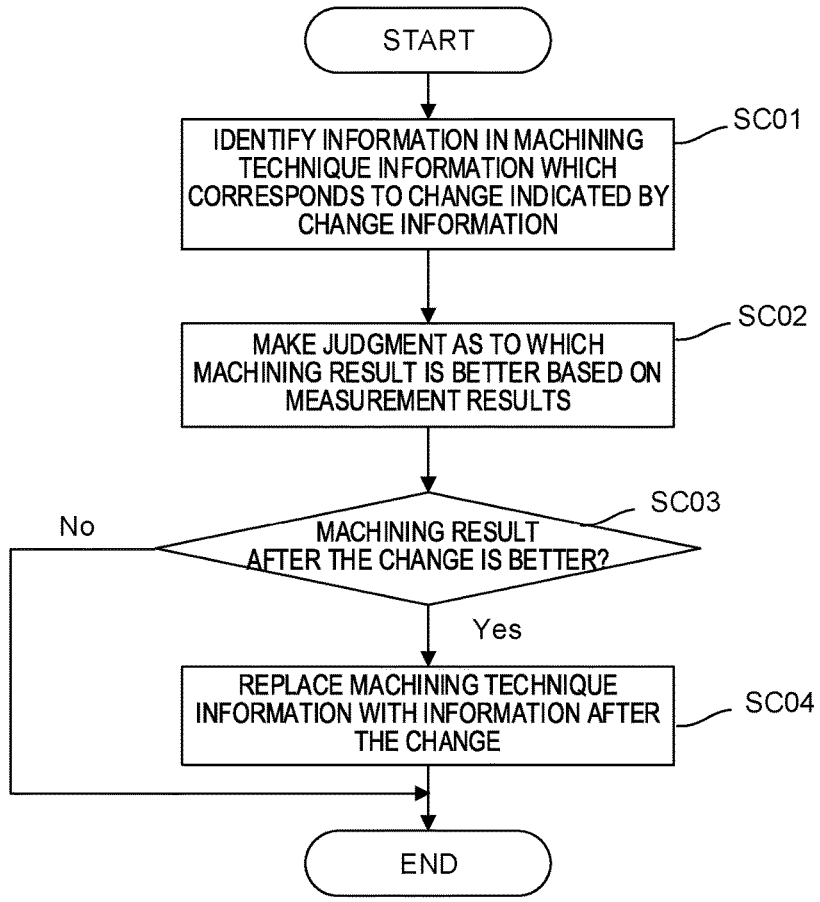

CAD/CAM-CNC INTEGRATED SYSTEM

RELATED APPLICATIONS

The present application claims priority to Japanese Application Number 2016-148664 filed Jul. 28, 2016, the disclosure of which is hereby incorporated by reference herein in its entirety.

BACKGROUND OF THE INVENTION

1. Field of the Invention

The present invention relates to CAD/CAM-CNC integrated systems.

2. Description of the Related Art

A CNC integrated CAM system is publicly known which uses machining conditions organized based on a machining shape or a tool when creating a machining command by computer-aided manufacturing (CAM: a system that supports creation of command data to a numerical controller with a computer) (see, for example, ISO14649 and Japanese Application Laid-Open No. 2015-525420). Moreover, a system is also known which makes it possible to describe a machining command in a structured format to implement a machining command with machine tool neutrality (not containing information depending on a machine tool and not depending on a machine) (see, for example, Japanese Patent Application Laid-Open No. 2009-53736).

Meanwhile, in a machining site, a machining command created by using CAM is not only used as it is, but also used, in many cases, by a computer numerical controlled (CNC) machine tool after being modified by an operator, for example. Modifications made to the machining command by the operator and data concerning the machining state in machining performed by using the modified machining command often contain effective information that would improve the machining conditions.

By creating a structured machining command with machine tool neutrality, the above-described prior art technique makes it possible to use the created machining command efficiently without depending on a machine tool. However, although the machining command is structured, no means to structure data concerning machining in relation to the structured machining command and manage the structured data has been offered, which makes it impossible to feed the modifications made to the machining command by the operator in the machining site or data concerning the machining state in machining performed by using the modified machining command efficiently back to the CAM and make full use of these data in the CNC integrated CAM system or the like.

SUMMARY OF THE INVENTION

An object of the present invention is accordingly to provide a CAD/CAM-CNC integrated system that makes it easy to make use of the know-how accumulated in a machining site by feeding the know-how back to CAM.

In the present invention, for solving the above-described problem, a shared database is provided in a system in which CAD/CAM and a CNC machine tool are connected via a network, and the information collected during machining or a change made to a machining command by an operator are stored in the shared database in association with structured information of the machining command, and the information collected from a machining site is fed back to the CAM via the shared database, and the information fed back to the CAM is analyzed so that machining technique information is updated.

The present invention relates to a CAD/CAM-CNC integrated system that is configured with devices related to processes from design of a product to machining, the devices including CAD, CAM, and a CNC machine tool, each of the devices is connected to a shared database that allows each device to set information therein and read information therefrom, and the shared database contains machining technique information which is referred to at the time of creation of a machining command. The machining command which is used by the CNC machine tool at the time of machining contains information on machining which is described in a format complying with a data model of a hierarchical structure. The CNC machine tool includes a machining command decoding and executing section that decodes the machining command and carries out machining in accordance with the machining command based on the result of decoding, a change recording section that records a change made to the machining command by an operator, as change information, in the shared database in association with a changed level of a hierarchy of the machining command, and a machining information recording section that records information on machining obtained during execution of the machining based on the machining command, as machining execution information, in the shared database in association with the machining command. The devices further include a machining technique information updating section that updates the machining technique information based on the change information and the machining execution information.

The machining command may contain additional information including designation of a characteristic point of at least one of a tool path and a product shape.

The machining command may be described in a format that does not depend on an individual machine tool, and may be changed to an instruction to the individual machine tool when decoding the machining command by the CNC machine tool.

The machining execution information may include at least the current value of a feed-axis drive motor.

The machining execution information may include at least vibration information of a machine.

The change recording section may be configured so as to urge a worker to enter a reason for a change.

The machining execution information may also include a record of operations, including a change of a speed override, performed by a worker.

According to the present invention, it is possible to improve a machining command by making use of the know-how accumulated in a machining site and achieve an improvement in machining quality and reduction of the machining time. Moreover, by improving a machining technique database of the CAM by analyzing the machining state, it is possible to achieve an improvement in machining quality.

BRIEF DESCRIPTION OF THE DRAWINGS

FIG. 3A is a flowchart of the flow of processing in which a machining command decoding and executing section of FIG. 1 carries out machining based on the machining command.

FIG. 3B is a diagram depicting an example of "under-execution information" which is set in processing in Step SA02 of FIG. 3A.

FIG. 4A is a flowchart of the flow of processing which is executed by a machining information recording section of FIG. 1.

FIG. 4B is a diagram depicting an example of machining execution information which is recorded by the machining information recording section of FIG. 1.

FIG. 5 is a diagram depicting an example of change information which is recorded by a change recording section of FIG. 1.

FIG. 6 is a flowchart of the flow of processing to update machining technique information which is performed by a machining technique information updating section of FIG. 1.

DETAILED DESCRIPTION OF THE PREFERRED EMBODIMENT

Figure 1:
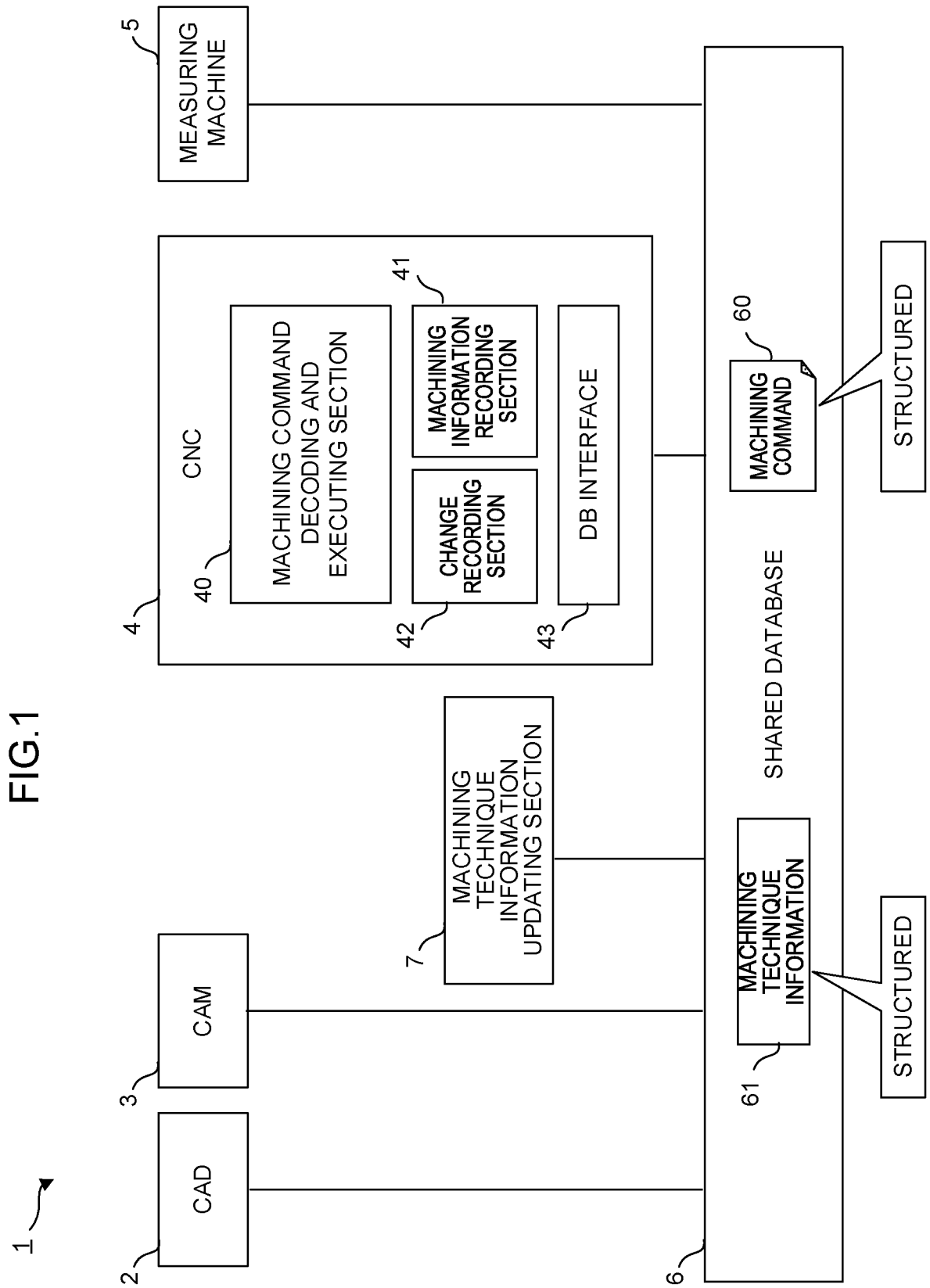
FIG. 1 is a schematic configuration diagram of a CAD/CAM-CNC integrated system according to an embodiment of the present invention.

FIG. 1 is a schematic configuration diagram of a CAD/CAM-CNC integrated system according to an embodiment of the present invention.

In a CAD/CAM-CNC integrated system 1 of the present embodiment, devices related to processes from design of a product to machining, which include computer-aided design (CAD) 2, CAM 3, a CNC machine tool 4, and a measuring machine 5, are connected to a shared database 6 via a network.

The CAD 2 is a computer system for designing a product. The CAD 2 supports design of a product which is carried out by a designer via an unillustrated user interface and creates CAD data indicating the shape of a product designed by the designer. The CAD 2 stores the created CAD data in the shared database 6. The CAD 2 may be configured as a single device or a CAD/CAM system by being combined with the CAM 3. Since the functions of the CAD 2 for supporting design of a product are already publicly known as a common CAD system, detailed explanations thereof will be omitted in the present specification.

The CAM 3 is a computer system that creates a machining command 60 which is used in the CNC machine tool 4 based on the CAD data created by the CAD 2. The CAM 3 creates the machining command 60 containing a tool path calculated based on the CAD data created by the CAD 2, a machining shape which is automatically recognized from the CAD data or recognized based on the CAD data and an input via a user interface (not depicted in the drawing) of the CAM 3, and information, such as a tool which is used and a cutting condition, included in machining technique information 61 read from the shared database 6, and other information (such as internal data of the CAM 3). Incidentally, if a system in which the CNC machine tool 4 obtains a tool path is adopted, the tool path is not contained in the machining command 60. A characteristic point of a product shape, such as a point on the line of intersection of two planes, is described as a characteristic point on the tool path or a characteristic point of a machining shape.

The CAM 3 stores the created machining command 60 in the shared database 6. The CAM 3 may be configured as a single device or a CAD/CAM system by being combined with the CAD 2. Since the functions of the CAM 3 for creating the machining shape are already publicly known as a common CAM system, detailed explanations thereof will be omitted in the present specification.

Figure 2A:
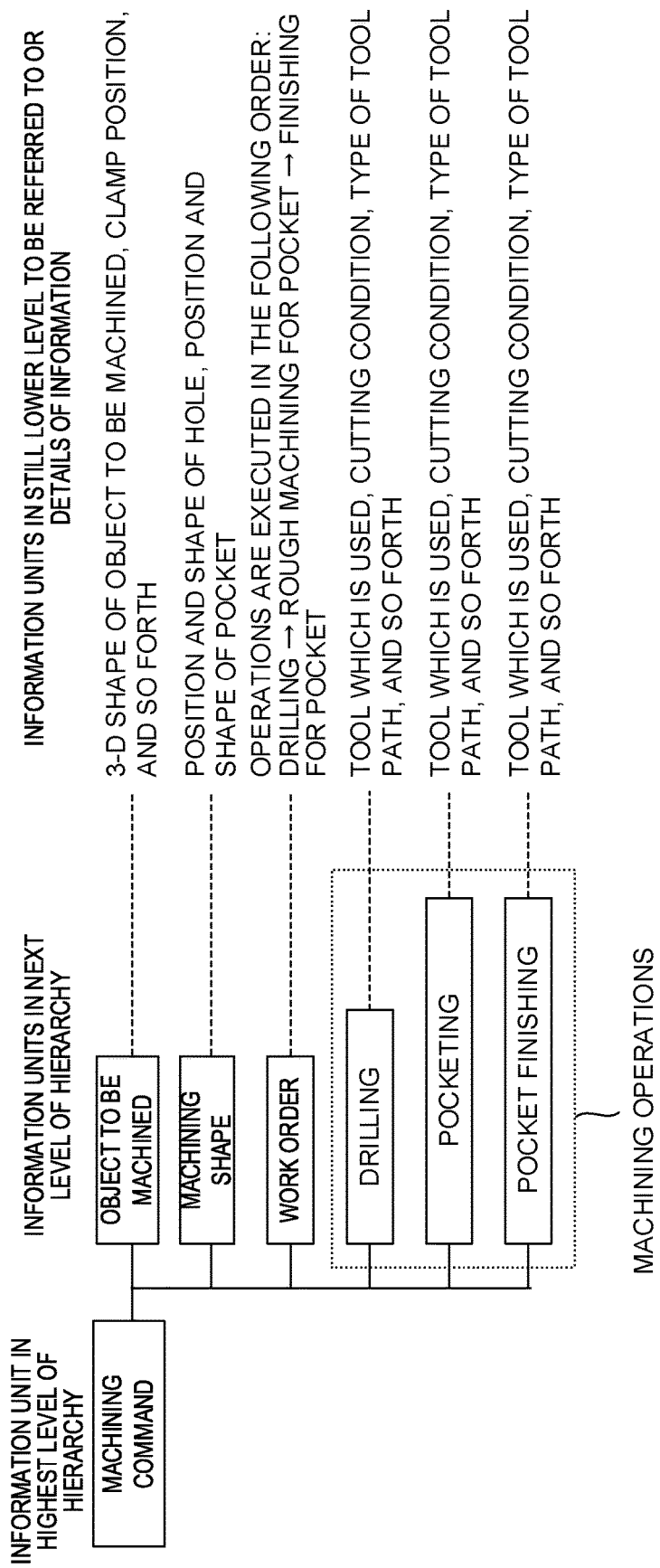
FIG. 2A is a diagram depicting an example of a machining command which is used in the CAD/CAM-CNC integrated system of FIG. 1.

FIG. 2A depicts an example of the machining command 60 which is used in the CAD/CAM-CNC integrated system 1 according to the present embodiment.

The machining command 60 which is used in the CAD/CAM-CNC integrated system 1 is hierarchically structured information. The information unit in highest level of hierarchy is a machining command (containing identification information such as a machining command name), which includes, in the next level of the hierarchy, information units such as an object to be machined, a machining shape, a work order, and machining operations (drilling, pocketing, pocket finishing). Each of these information units may be configured so as to include a still lower-level information unit.

Figure 2B:
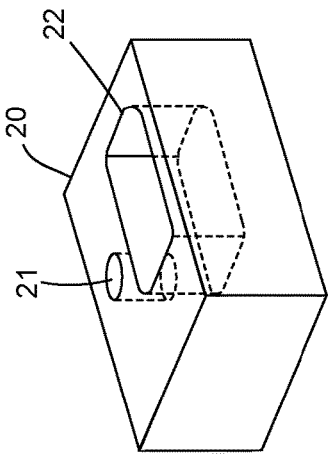
FIG. 2B is a diagram depicting an example of a product shape which is obtained by machining by the machining command of FIG. 2A.

The information which is included in each information unit will be described by taking up, as an example, a case in which machining is performed to obtain a product shape 20 having two machining shapes (a hole 21 and a pocket 22) as depicted in FIG. 2B (a case in which three machining operations, drilling, rough machining for the pocket 22, and finishing for the pocket 22, have to be performed). The information unit of an object to be machined further includes still lower-level information units such as the 3-D shape of the object to be machined and a clamp position, and the information unit of machining shape further includes still lower-level information units such as the position and shape of a hole to be machined and the position and shape of a pocket to be machined. Moreover, the information unit of a work order includes information indicating the order of machining operations (drilling→rough machining for the pocket 22→finishing for the pocket 22), and the information units of machining operations further include an information unit of drilling (which further includes still lower-level information units such as a tool which is used, a cutting condition, and the type of a tool path), an information unit of pocketing (which further includes still lower-level information units such as a tool which is used, a cutting condition, and the type of a tool path), and an information unit of pocket finishing (which further includes still lower-level information units such as a tool which is used, a cutting condition, and the type of a tool path).

The CNC machine tool 4 reads the machining command 60 created by the CAM 3 from the shared database 6 and carries out machining operations based on the read machining command 60. The CNC machine tool 4 includes a machining command decoding and executing section 40, a machining information recording section 41, a change recording section 42, and a DB interface 43.

The machining command decoding and executing section 40 reads the machining command 60 from the shared database 6 via the DB interface 43 and decodes the read machining command 60, determines a machining procedure based on the decoding result, and carries out machining of workpiece in accordance with the machining procedure thus determined. When executing machining based on the machining command 60 read from the shared database 6, the machining command decoding and executing section 40 determines the order of machining operations by referring to the information unit of a work order contained in the machining command 60 and carries out machining by referring to the information units of machining operations, which are contained in the machining command 60, in order in accordance with the machining order thus determined.

FIG. 3A is a flowchart indicating the flow of processing in which the machining command decoding and executing section 40 carries out machining based on the machining command 60.

When identifying a first machining operation from the information unit of a work order contained in the machining command 60 (Step SA01), the machining command decoding and executing section 40 obtains information on machining from the information unit of the machining operation thus identified and sets the information as "under-execution information" in an under-execution information storage area provided on unillustrated memory (Step SA02). An example of the under-execution information thus set is depicted in FIG. 3B.

Then, the machining command decoding and executing section 40 carries out the machining operation based on the set under-execution information (Step SA03). When carrying out the machining operation, the machining command decoding and executing section 40 carries out machining by generating and executing an NC command that is executable by the CNC machine tool 4 based on the information, such as the cutting condition, which is set in the under-execution information. Then, when the machining operation based on the set under-execution information is finished, the machining command decoding and executing section 40 determines whether or not there is a next machining operation by referring to the information unit of a work order contained in the machining command 60 (Step SA04). If there is a next machining operation, the machining command decoding and executing section 40 sets this machining operation as a next operation to be performed and repeats the processing from Step SA02. On the other hand, if there is not a next machining operation, the machining command decoding and executing section 40 ends the machining operations based on the machining command 60. Incidentally, a technique for creating an NC command that is executable by the CNC machine tool based on a command that does not depend on the CNC machine tool 4 and a machining shape has already been publicly known in, for example, Japanese Patent Application Laid-Open No. 2009-53736, so detailed explanations thereof will be omitted in the present specification.

The machining information recording section 41 collects information which is obtained from a servo amplifier, a servo motor, a sensor, and so forth which are attached to the sections of the CNC machine tool 4, while the machining command decoding and executing section 40 is executing the machining operations based on the machining command 60, and records the collected information as machining execution information.

FIG. 4A is a flowchart of the flow of processing which is executed by the machining information recording section 41 of FIG. 1, and FIG. 4B is a diagram depicting an example of the machining execution information which is recorded by the machining information recording section 41.

The machining information recording section 41 determines whether a timing for obtaining the machining execution information has arrived or not (Step SB01). If the timing for obtaining the machining execution information has arrived, the machining information recording section 41 collects the information from the sections of the CNC machine tool 4 and temporarily stores the information, as the machining execution information, in a machining execution information storage area provided on the unillustrated memory and, then stores the machining execution information in the shared database 6 via the DB interface 43 in association with the machining command 60 after the completion of the machining operations (Step SB02). This machining execution information includes, as depicted in FIG. 4B, for example, various kinds of information on machining such as the name of the machining command 60 which is being executed, the name of a machining operation which is being executed, the start time and the finish time of each machining operation, the time-series recorded temperatures of the machine, the current value of a feed-axis drive motor, vibration information of the CNC machine tool 4 detected by a vibration sensor, and an override value.

The change recording section 42 records the details of a change made to the information changed by the operator, among the information contained in the machining command 60. Before the start of the machining operations based on the machining command 60 by the machining command decoding and executing section 40, the CNC machine tool 4 allows the operator to refer to the information on the machining operations read from the machining command 60 by displaying the information on an unillustrated display device and change the cutting condition or the like included in the machining operations by operating an unillustrated input device when necessary. The change recording section 42 temporarily stores the details of the change as change information in a change information storage area provided on the unillustrated memory. Then, after the completion of the machining operations, the change recording section 42 stores the change information in the shared database 6 via the DB interface 43 in association with the machining command 60.

FIG. 5 is a diagram depicting an example of the change information which is recorded by the change recording section 42.

The change information includes the name of the machining operation to which a change was made, the name of the operator who made the change, the time at which the change was made, the position of the information unit including the changed information in the machining command information structure (a path to that information), and the value of the changed information before the change and the value after the change. The change recording section 42 may urge the operator to enter a reason for the change and add the entered reason for the change to the change information.

The measuring machine 5 is a machine that measures the finished state (the roughness of a machined surface, an error at a corner portion, and so forth) of a product machined based on the machining command 60. The measuring machine 5 may measure the finished state of the machined product by being operated by the operator or automatically measure the finished state of the machined product by obtaining the machined product by a robot arm which operates together with the CNC machine tool 4. The measurement results obtained by the measurement of the measuring machine 5 are recorded on the shared database 6 in association with the machining command 60 along with the measurement time and so forth.

The machining technique information updating section 7 updates the machining technique information 61 stored in the shared database 6. The machining technique information 61 is information that is referred to by the CAM 3 when the CAM 3 creates the machining command 60, and includes at least information on the finished state of a product, such as machining shape, quality of material of a workpiece, dimensional tolerance, geometric tolerance, and surface roughness, and information on a tool which is used and a cutting condition in accordance with machining intention information indicating priorities on the machining time and machining accuracy are stored. Examples of the information on the finished state of a product include a machining shape, the material of an object to be machined, dimensional tolerances, geometrical tolerances, and machined surface roughness. If there is a need to add a machine tool which is used or a way to clamp an object to be machined to the conditions, these pieces of information may be added to the machining technique information 61.

When creating the machining command 60, the CAM 3 refers to, in addition to the information entered by the operator or the like, the machining technique information 61 read from the shared database 6, sets a tool that is used in each machining condition or a cutting condition, and creates the machining command 60 based on the details thus set. The machining technique information updating section 7 updates the machining technique information 61 based on the machining command 60, the change information or machining execution information fed back from the CNC machine tool 4 or the measuring machine 5, the information on the finished state of a product, and the machining intention information.

FIG. 6 is a flowchart depicting the flow of processing to update the machining technique information 61 which is performed by the machining technique information updating section 7.

The machining technique information updating section 7 refers to the change information fed back from the CNC machine tool 4 and identifies the information in the machining technique information 61 which corresponds to the change indicated by the change information (Step SC01). Since the change information includes, for example, identification information of the machining command 60 to which the change was made and a path to the changed information, by identifying the machining command 60 corresponding to the change indicated by the change information and then identifying the condition at the time of machining based on, for example, the cutting condition contained in the machining command 60, it is possible to identify the information in the machining technique information 61 which corresponds to the change indicated by the change information.

Incidentally, it is assumed here that all the information on the machining technique which is described in the machining command 60 is registered in the machining technique information 61 in the shared database 6 and information on surface roughness or the like which would be observed if machining was performed based on that information is also registered together therewith.

Next, the machining technique information updating section 7 makes a judgment as to which machining result, the machining result before the change or the machining result after the change, is better by comparing the machining execution information in machining performed after the change indicated by the change information or the information on the finished state of a product obtained by that machining with the machining execution information or the information on the finished state of the product before the change (Step SC02). It is possible to identify the correspondence between the change information and the machining execution information or the information on the finished state of a product by comparing, for example, the information correlated with the machining command 60 or the time information recorded on each piece of information with each other. In making a judgment as to which machining result is better, a judgment may be made, for example, as follows: scores are calculated by assigning weights to the surface roughness of a product, the length of a machining time, vibration which is produced in a machine tool, and so forth, the scores are added together, and a determination is made that the machining result after the change is better if the scores based on the information after the change are higher than the scores based on the information before the change. Incidentally, the information based on which a judgment is made with higher priority being given thereto may be determined as appropriate in accordance with the purpose.

Incidentally, it is assumed here that the information obtained when machining was performed after the change is also registered in the shared database 6 from the measuring machine 5. In making a judgment as to which machining result is better, if the machining technique information updating section 7 judges that the machining result after the change is better (Step SC03), the machining technique information updating section 7 replaces a relevant item of the machining technique information 61 with the information after the change (Step SC04). Moreover, in making a judgment as to which machining result is better, if the machining technique information updating section 7 judges that the machining result after the change is not better, the machining technique information updating section 7 ends this processing without updating the machining technique information 61.

While the embodiment of the present invention has been described, the present invention is not limited to the example of the embodiment described above and can be carried out in various modes by being changed or modified appropriately.

The machining information recording section 41 may record, as the machining execution information, the operation performed by the operator while machining based on the machining command 60 is being performed. For example, if the operator changes a speed override by operating an operating panel during the execution of machining based on the machining command 60, the machining information recording section 41 may record the details of the change in the shared database 6, as the machining execution information, in association with the machining command 60. The machining technique information updating section 7 may use the machining execution information recorded in this manner, like the change information, for updating of the machining technique information 61.

The above-described embodiment deals with a case in which the machining technique information updating section 7 automatically updates the machining technique information 61, but the machining technique information 61 may be manually updated on the CAM 3 based on the current machining technique information 61 and machining execution information. Moreover, these pieces of information may be displayed on a display screen of the CNC machine tool 4 so that workers on the machining site can use the information to improve the cutting condition or the like at their own judgment.

What is claimed is:
1. A CAD/CAM-CNC integrated system that is configured with devices related to processes from design of a product to machining, the devices including CAD, CAM, and a CNC machine tool, wherein
each of the devices is connected to a shared database that allows each device to set information therein and read information therefrom,
the shared database contains machining technique information which is referred to at a time of creation of a machining command,
the machining command which is used by the CNC machine tool at a time of machining contains informa- tion on machining which is described in a format complying with a data model of a hierarchical structure, the CNC machine tool includes
- a machining command decoding and executing section that decodes the machining command and carries out machining in accordance with the machining command based on a result of decoding,
- a change recording section that records a change made to the machining command by an operator, as change information, in the shared database in association with a changed level of a hierarchy of the machining command, and
- a machining information recording section that records information on machining obtained during execution of the machining based on the machining command, as machining execution information, in the shared database in association with the machining command, and the devices further include a machining technique information updating section that updates the machining technique information based on the change information and the machining execution information.

2. The CAD/CAM-CNC integrated system according to claim 1, wherein
the machining command contains additional information including designation of a characteristic point of at least one of a tool path and a product shape.

3. The CAD/CAM-CNC integrated system according to claim 1, wherein
the machining command is described in a format that does not depend on an individual machine tool, and is changed to an instruction to the individual machine tool when decoding the machining command by the CNC machine tool.

4. The CAD/CAM-CNC integrated system according to claim 1, wherein
the machining execution information includes at least a current value of a feed-axis drive motor.

5. The CAD/CAM-CNC integrated system according to claim 1, wherein the machining execution information includes at least vibration information of a machine.

6. The CAD/CAM-CNC integrated system according to claim 1, wherein
the change recording section is configured so as to urge a worker to enter a reason for a change.

7. The CAD/CAM-CNC integrated system according to claim 1, wherein
the machining execution information also includes a record of operations, including a change of a speed override, performed by a worker.

8. The CAD/CAM-CNC integrated system according to claim 1, wherein
the information on machining includes at least information about a product shape of the product, and
the machining technique information includes at least information about the product shape.

9. The CAD/CAM-CNC integrated system according to claim 8, wherein
the product shape includes at least a machining shape, and
at least one of the devices is configured to automatically recognize the machining shape from data for the CAD, or
based on the data for the CAD and an input via a user interface of the CAM.

* * * * *